(12) United States Patent
Sohn

(10) Patent No.: US 9,010,128 B2
(45) Date of Patent: Apr. 21, 2015

(54) COOLING DEVICE

(76) Inventor: Chun Shig Sohn, Toronto (CA)

( * ) Notice: Subject to any disclaimer, the term of this patent is extended or adjusted under 35 U.S.C. 154(b) by 1210 days.

(21) Appl. No.: 12/813,757

(22) Filed: Jun. 11, 2010

(65) Prior Publication Data

US 2011/0302930 A1    Dec. 15, 2011

(51) Int. Cl.
*F25B 21/00* (2006.01)
*F25D 19/00* (2006.01)

(52) U.S. Cl.
CPC .............. *F25B 21/00* (2013.01); *F25D 19/006* (2013.01); *Y02B 30/66* (2013.01); *F25B 2321/002* (2013.01)

(58) Field of Classification Search
CPC .. F25D 19/006; F25B 21/00; F25B 2321/002; F25B 2321/0021; F25B 2321/0022
USPC ............................................................. 62/3.1
See application file for complete search history.

(56) References Cited

U.S. PATENT DOCUMENTS

| | | | | |
|---|---|---|---|---|
| 3,691,501 A | * | 9/1972 | Katchka et al. ............... 337/393 |
| 4,457,135 A | * | 7/1984 | Hakuraku et al. ................ 62/3.1 |
| 4,459,811 A | | 7/1984 | Barclay et al. |
| 4,649,712 A | * | 3/1987 | Tate et al. ........................ 62/137 |
| 5,209,068 A | * | 5/1993 | Saji et al. .......................... 62/3.1 |
| 5,641,424 A | | 6/1997 | Ziolo et al. |
| 6,293,106 B1 | | 9/2001 | Acharya et al. |
| 6,446,441 B1 | * | 9/2002 | Dean ................................. 62/3.1 |
| 6,588,216 B1 | * | 7/2003 | Ghoshal ........................... 62/3.1 |
| 6,598,409 B2 | * | 7/2003 | Shyy et al. ....................... 62/115 |
| 8,375,727 B2 | * | 2/2013 | Sohn ................................. 62/3.1 |
| 2004/0182086 A1 | * | 9/2004 | Chiang et al. .................... 62/3.1 |
| 2006/0278373 A1 | * | 12/2006 | Hsu .......................... 165/104.33 |
| 2009/0113897 A1 | * | 5/2009 | Dinesen et al. .................. 62/3.1 |

OTHER PUBLICATIONS

Ames Laboratory "Magnetic Refrigerator Successfully Tested: Ames Laboratory developments push boundaries of new refrigeration technology" News release Dec. 7, 2001 [Online: http://www.external.ameslab.gov/news/release/01magneticrefrig.htm].

Prachi Patel "A Plastic That Chills:Materials that change temperature in response to electric fields could keep computers—and kitchen fridges—cool." Technology Review, published by MIT Aug. 11, 2008 [Online: http://www.studybusiness.com/dir/dir/Download/EVT/1554.html with English version at http://www.technologyreview.com/Nanotech/21205/?a=f].

\* cited by examiner

*Primary Examiner* — Frantz Jules
*Assistant Examiner* — Brian King
(74) *Attorney, Agent, or Firm* — Maschoff Brennan

(57) ABSTRACT

A cooling device includes a magnetocaloric unit disposed between a heat sink and a heat load, an electromagnet operably connected with the magnetocaloric unit, and at least one refrigerant storage included in the magnetocaloric unit, wherein the magnetocaloric unit is cooled down by using an evaporation heat of a refrigerant in the refrigerant storage.

20 Claims, 11 Drawing Sheets

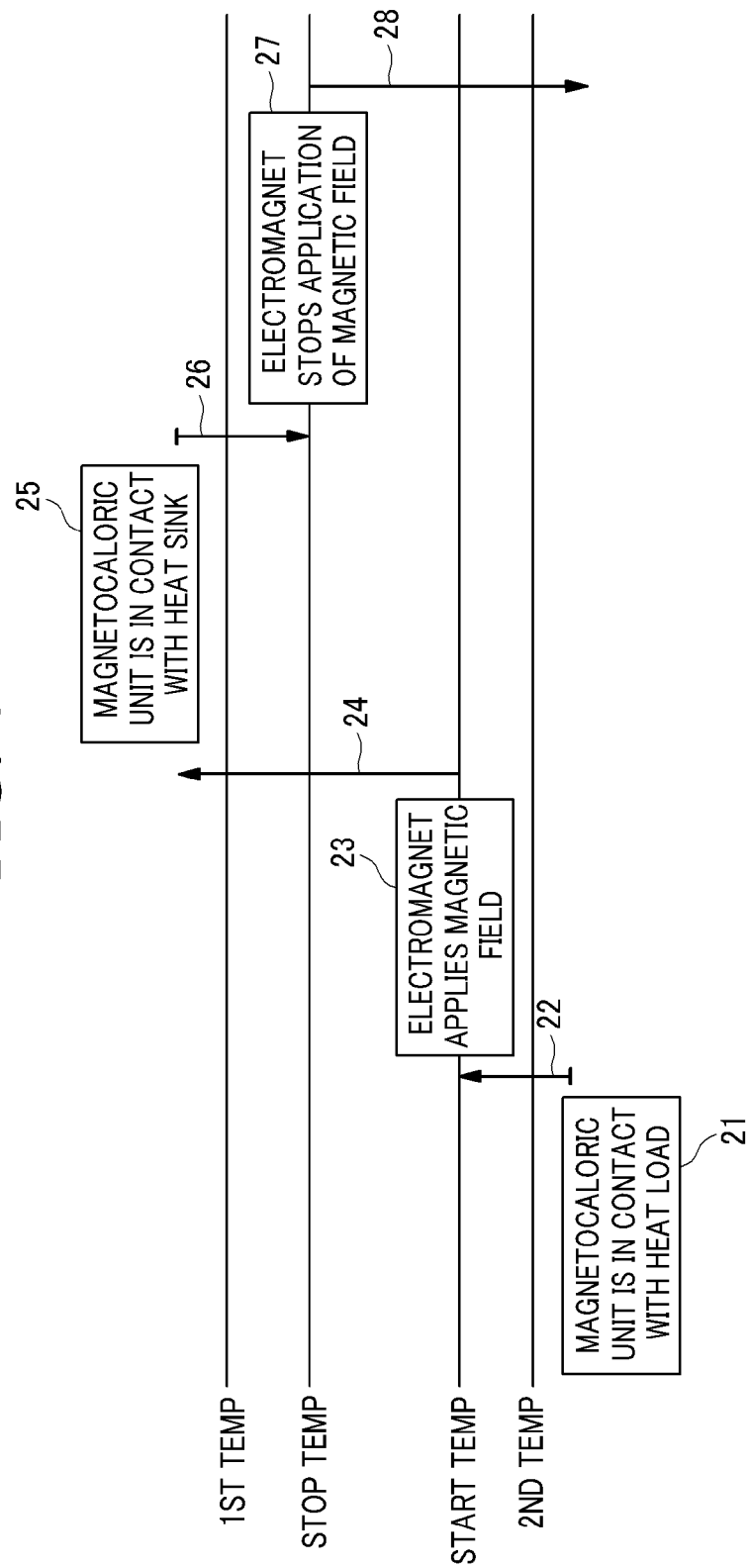

COOLING DEVICE

BACKGROUND

Magnetic refrigeration is a cooling technology based on the magnetocaloric effect. This technique can be used to attain extremely low temperatures, as well as the ranges used in common refrigerators, depending on the design of the system, such as a small-sized home freezer, a large-sized commercial freezer, an air conditioner, a heat pump, a distiller, or a drier. The magnetocaloric effect is a magneto-thermodynamic phenomenon in which a reversible change in temperature of a suitable material is caused by exposing the material to a changing magnetic field.

SUMMARY

Various embodiments of cooling devices are disclosed herein. In one embodiment, a cooling device includes a magnetocaloric unit disposed between a heat sink and a heat load, an electromagnet operably connected with the magnetocaloric unit, and at least one refrigerant storage included in the magnetocaloric unit. The magnetocaloric unit is cooled down by using evaporation heat of a refrigerant in the refrigerant storage.

In another embodiment, a magnetocaloric device includes a magnetocaloric material, and at least one refrigerant storage, the at least one refrigerant storage surrounded by the magnetocaloric material.

In still another embodiment, a method for controlling a cooling device is provided. A magnetocaloric unit is placed between a heat sink and a heat load of the cooling device. The method includes providing the magnetocaloric unit with at least one refrigerant storage, absorbing heat in the heat load by the magnetocaloric unit, isolating the magnetocaloric unit from the heat load by at least one first switch disposed between the magnetocaloric unit and the heat load, applying a magnetic field to the magnetocaloric unit, and cooling down the magnetocaloric unit by evaporation heat of a refrigerant in the at least one refrigerant storage.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIG. 4 shows a schematic diagram of an operation of the cooling device in response to a temperature of the magnetocaloric unit.

DETAILED DESCRIPTION

Figure 1:
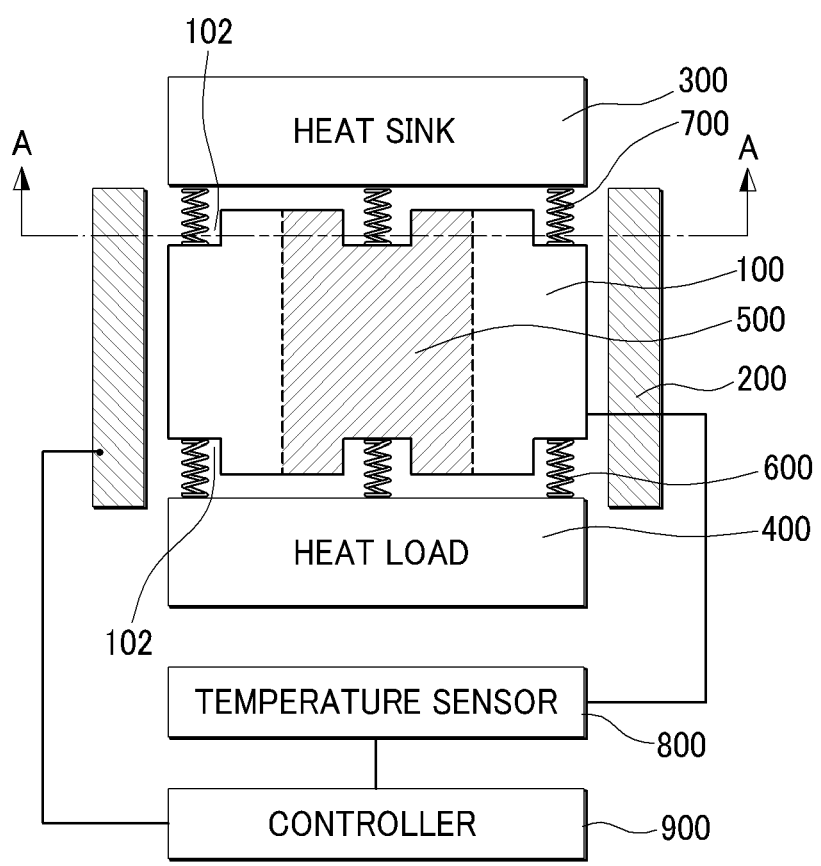
FIG. 1 is a cross-sectional view of an illustrative embodiment of a cooling device.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

FIG. 1 shows a cross-sectional view of an illustrative embodiment of a cooling device. The cooling device may include a magnetocaloric unit 100, an electromagnet 200, a heat sink 300, a heat load 400, a refrigerant storage 500 filled with a refrigerant, a first switch 600, a second switch 700, a temperature sensor 800, and/or a controller 900. Some embodiments may optionally lack some of the listed elements. For example, the cooling device may optionally lack one or more of first switch 600, second switch 700, temperature sensor 800 and controller 900, which will be described hereinafter.

Magnetocaloric unit 100 may be disposed between heat sink 300 and heat load 400 and it may include a magnetocaloric material. FIG. 1 illustrates that magnetocaloric unit 100 is mounted over heat load 400 with first switch 600 therebetween and heat sink 300 is mounted over magnetocaloric unit 100 with second switch 700. FIG. 1 further illustrates that magnetocaloric unit 100 includes recesses 102 facing heat sink 300 and heat load 400 to receive first and second switches 600 and 700. First and second switches 600 and 700 may be configured to control thermal conduction between magnetocaloric unit 100 and heat sink 300 and heat load 400, which will be described in detail.

Still further, magnetocaloric unit 100 may be configured to exhibit a reversible change in temperature in response to the application of a magnetic field. Specifically, the temperature of magnetocaloric unit 100 may reversibly increase and decrease by changing entropy therein in response to the application of the magnetic field. Further, magnetocaloric unit 100 may absorb heat from heat load 400 after magnetocaloric unit 100 is cooled down by the refrigerant in refrigerant storage 500. Also, the magnetocaloric unit 100 may transfer heat to heat sink 300. When magnetocaloric unit 100 is in contact with heat load 400, magnetocaloric unit 100 may absorb heat from heat load 400 by thermal conduction. Meanwhile, when magnetocaloric unit 100 is in contact with heat sink 300, magnetocaloric unit 100 may transfer heat to both heat sink 300 and the refrigerant in refrigerant storage 500 by thermal conduction. Heat transfer of magnetocaloric unit 100 between heat sink 300 and heat load 400 will be described hereinafter.

Magnetocaloric unit 100 may absorb the heat generated by heat load 400 and lower a temperature of heat load 400 by using the magnetocaloric material. The magnetocaloric material is used to lower a temperature of heat load 400 by changing entropy of magnetic moments therein. The magnetocaloric material can be heated in response to a magnetic field whereas it can be cooled by withdrawing the applied magnetic field. The magnetocaloric material may include, for example, but not limited to, Gadolinium (Gd), $Fe_3O_4$/Au, GdDyN, LaCaMnO, NdSrMnO or MnFe (P, As) alloys. The magnetic cooling cycle with the magnetocaloric material will be described in detail with reference to FIG. 2.

Figure 2:
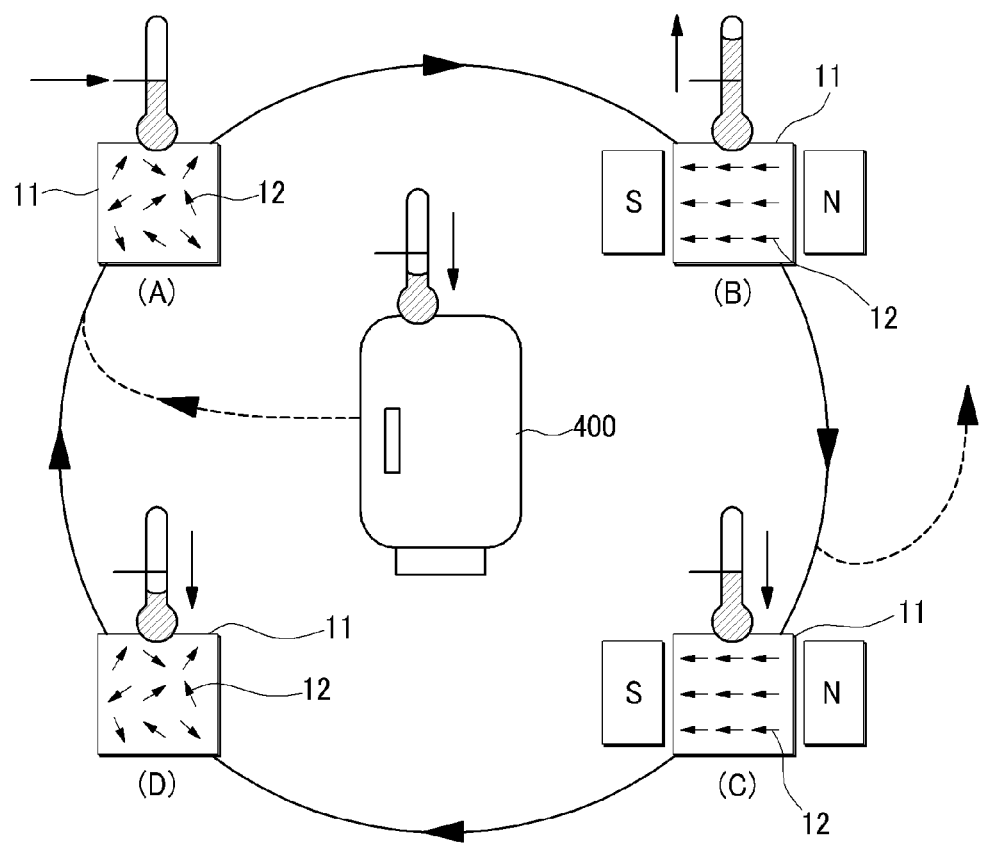
FIG. 2 shows a schematic diagram of a magnetic cooling cycle of the magnetocaloric material shown in FIG. 1.

FIG. 2 shows a schematic diagram of a magnetic cooling cycle of the magnetocaloric material shown in FIG. 1. If a magnetic field is not applied to a magnetocaloric material 11, magnetocaloric material 11 may have randomly oriented magnetic moments 12 (Stage A). Here, magnetic moments 12 refer to a measure of its tendency to align with a magnetic field. Then, if a magnetic field is applied to magnetocaloric material 11, magnetic moments 12 in magnetocaloric material 11 may be arranged in a single direction, as shown in FIG. 2, resulting in heating of magnetocaloric material 11 (Stage B).

Heat may be emitted from magnetocaloric material 11 to its surroundings by heat transfer, as depicted by the dot-lined arrow in FIG. 2 (Stage C). Such heat transfer may be accomplished by a refrigerant adjacent to magnetocaloric material 11, which will be described in detail hereinafter. Finally, if the magnetic field is removed from magnetocaloric material 11, magnetic moments 12 may be randomized again (Stage D), which leads to cooling of magnetocaloric material 11. As depicted in FIG. 2, the temperature of magnetocaloric material 11 at Stage D is lower than that of magnetocaloric material 11 at Stage A. Thus, the heat from heat load 400, which is in contact with magnetocaloric unit 100 having magnetocaloric material 11, may be emitted to an outside heat load 400 through magnetocaloric material 11 of magnetocaloric unit 100, by applying the magnetic field to magnetocaloric unit 100 and then removing the magnetic field from magnetocaloric unit 100.

Electromagnet 200 may be configured to be operably connected with magnetocaloric unit 100. For example, electromagnet 200 may be adjacent to magnetocaloric unit 100 such that electromagnet 200 can apply a magnetic field to magnetocaloric unit 100. Electromagnet 200 may apply a magnetic field to magnetocaloric unit 100 in response to an electric field applied from an external device, for example, an electric power source (not shown). By way of example, electromagnet 200 may include a solenoid coil and, thus, electromagnet 200 may apply the magnetic field to magnetocaloric unit 100 in response to the electric field applied from the external electric power source.

Heat sink 300 may be configured to absorb heat from magnetocaloric unit 100 by thermal conduction and to emit it to an outside. Heat sink 300 may absorb the heat from magnetocaloric unit 100 by being in contact with magnetocaloric unit 100. The contact between heat sink 300 and magnetocaloric unit 100 can be controlled by second switch 700 in response to the temperature of magnetocaloric unit 100, which will be described in detail hereinafter. By way of examples, heat sink 300 may include, but not limited to, an air-cooled or water-cooled radiator.

Heat load 400 may be configured to transfer heat to magnetocaloric unit 100 by thermal conduction when heat load 400 is in contact with magnetocaloric unit 100. Heat load 400 may transfer heat to magnetocaloric unit 100 by being in contact with magnetocaloric unit 100. The contact between magnetocaloric unit 100 and heat load 400 may be controlled by first switch 600 in response to the temperature of magnetocaloric unit 100, which will be described in detail hereinafter. Heat load 400 may include cooling apparatuses such as, but not limited to, a refrigerator, an air conditioner, a heat pump, or various kinds of chemical apparatuses.

Refrigerant storage 500 may be surrounded by the magnetocaloric materials of magnetocaloric unit 100 and filled with a refrigerant. The refrigerant may include, but is not limited to, methanol, ethanol, or perfluorocarbon (PFC). By way of example of PFC, FC-72™ can be used as the refrigerant. Further, the refrigerant in refrigerant storage 500 may absorb heat from magnetocaloric unit 100, thereby cooling down magnetocaloric unit 100.

Figure 3:
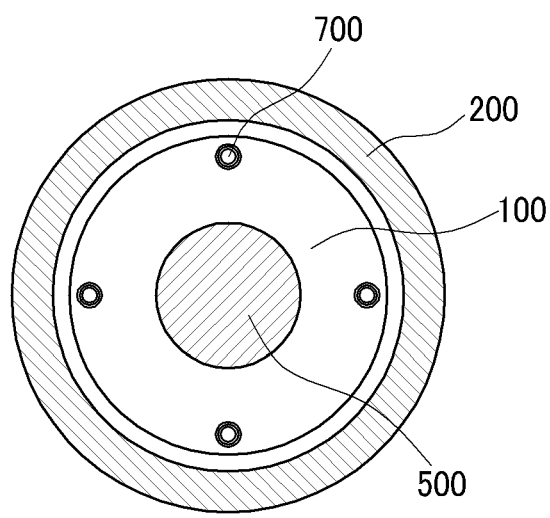
FIG. 3 is a top view of an illustrative embodiment of a magnetocaloric unit including a refrigerant storage and an electromagnet.

FIG. 3 is a sectional view taken along line A-A shown in FIG. 1. As depicted in FIG. 3, refrigerant storage 500 can be provided at substantially the central portion of magnetocaloric unit 100 and surrounded by magnetocaloric unit 100. Further, refrigerant storage 500 can be filled with a refrigerant. The refrigerant in refrigerant storage 500 can absorb heat from magnetocaloric unit 100 and be evaporated by the absorbed heat as evaporation heat. Evaporation heat is energy required to transform a liquid into a gas. When the refrigerant is evaporated, the refrigerant may absorb the evaporation heat from magnetocaloric unit 100. Thus, the refrigerant cools down magnetocaloric unit 100 by using the evaporation heat.

First switch 600 may be disposed between magnetocaloric unit 100 and heat load 400. FIG. 1 illustrates that three first switches 600 are received in three recesses 102 respectively formed two end portions and one central portion of an upper surface of magnetocaloric unit 100. Although FIG. 1 illustrates three recesses, it is apparent to those skilled in the art that magnetocaloric unit 100 can have one recess, two recesses or more than three recesses on a surface (e.g., an upper surface) facing heat load 400. First switch 600 may be configured to make magnetocaloric unit 100 in contact with or isolated from heat load 400 based on a temperature of magnetocaloric unit 100. By way of example, FIG. 1 illustrates that some portions of magnetocaloric unit 100 are isolated from heat load 400 by three first switches 600 received in three recesses 102 formed on the lower surface of magnetocaloric unit 100. That is, the portions of magnetocaloric unit 100 except for the portions on which recesses 102 are formed are isolated from heat load 400. However, the isolated portions of magnetocaloric unit 100 may be in contact with heat load 400 if a height of first switch 600 is decreased to the isolated distance between magnetocaloric unit 100 and heat load 400. A height of first switch 600 may be varied based on the temperature of magnetocaloric unit 100. For example, first switch 600 may include, but not limited to, a thermostat switch having a bimetal or a thermal liquid. A configuration and an operation of first switch 600 will be described later in more detail with reference to FIGS. 6A and 6B.

Second switch 700 may be disposed between magnetocaloric unit 100 and heat sink 300. FIG. 1 illustrates that three second switches 700 are received in three recesses 102 respectively formed two end portions and one central portion of a lower surface of magnetocaloric unit 100. Although FIG. 1 illustrates three recesses, it is apparent to those skilled in the art that magnetocaloric unit 100 can have one recess, two recesses or more than three recesses on a surface (e.g., a lower surface) facing heat load 400. Second switch 700 may be configured to make magnetocaloric unit 100 contact with or isolated from heat sink 300 based on a temperature of magnetocaloric unit 100. By way of example, FIG. 1 illustrates that some portions of magnetocaloric unit 100 are isolated from heat sink 300 by three second switches 700 received in three recesses 102 formed on the upper surface of magnetocaloric unit 100. That is, the portions of magnetocaloric unit 100 except for the portions on which recesses 102 are formed are isolated from heat sink 300. However, the isolated portions of magnetocaloric unit 100 may be in contact with heat sink 300 if a height of second switch 700 is decreased to the isolated distance between magnetocaloric unit 100 and heat sink 300. A height of second switch 700 may also be varied based on the temperature of magnetocaloric unit 100. For example, second switch 700 may include, but not limited to, a coil spring or a leaf spring. A configuration and an operation of second switch 700 will be described later in more detail with reference to FIG. 7.

Temperature sensor 800 may be configured to sense a temperature of magnetocaloric unit 100. Temperature sensor 800 may include, for example, but not limited to, a platinum resistance temperature sensor, a thermistor, a thermocouple, a radiation thermometer, or an IC temperature sensor. Further, temperature sensor 800 may transmit a signal indicative of a value of the sensed temperature to controller 900.

Controller 900 may be configured to receive the signal indicative of the value of the sensed temperature from temperature sensor 800 and to control the operation of electromagnet 200 based on the received signal. By way of example, FIG. 1 illustrates that controller 900 is operably coupled to temperature sensor 800 and electromagnet 200. In one embodiment, controller 900 may generate a control signal which activates or deactivates electromagnet 200 in response to the signal transmitted from temperature sensor 800. Controller 900 may transmit the control signal to electromagnet 200. Accordingly, the activation or deactivation of electromagnet 200 can be controlled by the control signal transmitted from controller 900.

FIG. 4 shows a schematic diagram of an operation of the cooling device in response to the temperature of magnetocaloric unit 100.

Hereinafter, magnetic-field-application-start temperature (hereinafter, simply referred to as "a start temperature") of magnetocaloric unit 100 refers to a temperature at which electromagnet 200 starts to apply a magnetic field to magnetocaloric unit 100, and magnetic-field-application-stop temperature (hereinafter, simply referred to as "a stop temperature") of magnetocaloric unit 100 refers to a temperature at which electromagnet 200 stops the application of the magnetic field to magnetocaloric unit 100.

The start temperature may be in the range from about $-9°$ C. to about $0°$ C., but it is not limited thereto. If magnetocaloric unit 100 is heated to the start temperature or higher by absorption of heat from heat load 400, heated magnetocaloric unit 100 may not efficiently absorb heat from heat load 400 anymore. Thus, if the temperature of magnetocaloric unit 100 increases to the start temperature, electromagnet 200 applies the magnetic field to magnetocaloric unit 100 to align the magnetic moment 12. The start temperature may be predetermined in consideration of a desired temperature of heat load 400.

Furthermore, the stop temperature may be in the range from about $50°$ C. to about $59°$ C., but it is not limited thereto. If magnetocaloric unit 100 is heated by the application of the magnetic field to magnetocaloric unit 100, the heat from heated magnetocaloric unit 100 is emitted through heat sink 300 or air by evaporation heat radiation of refrigerant. Then, if the temperature of heated magnetocaloric unit 100 decreases to the stop temperature, electromagnet 200 stops the application of the magnetic field to magnetocaloric unit 100. The stop temperature may be predetermined in consideration of a characteristic of a magnetocaloric material of magnetocaloric unit 100.

Further, heat-sink-contact temperature (hereinafter, simply referred to as "a first temperature") of magnetocaloric unit 100 refers to a temperature at which magnetocaloric unit 100 starts to be in contact with heat sink 300, and heat-load-contact temperature (hereinafter, simply referred to as "a second temperature") of magnetocaloric unit 100 refers to a temperature at which magnetocaloric unit 100 starts to be in contact with heat load 400.

The first temperature may be in the range from about $60°$ C. to about $65°$ C., but it is not limited thereto. Further, the second temperature may be in the range from about $-15°$ C. to about $-10°$ C., but it is not limited thereto. The first temperature and the second temperature may be predetermined in consideration of a characteristic of a magnetocaloric material of magnetocaloric unit 100. Further, operations of first switch 600 and second switch 700 may be controlled based on the first temperature and the second temperature. The operations of first switch 600 and second switch 700 will be explained with reference to FIGS. 6A, 6B and 7.

By way of example, if the temperature of magnetocaloric unit 100 increases higher than a first temperature, e.g., about $60°$ C., a height of second switch 700 may mechanically decrease in response to the increase of the temperature of magnetocaloric unit 100 and magnetocaloric unit 100 may be in contact with heat sink 300 by second switch 700. Further, if the temperature of magnetocaloric unit 100 decreases lower than a second temperature, e.g., about $-10°$ C., a height of first switch 600 may mechanically decrease in response to the decrease of the temperature of magnetocaloric unit 100 and magnetocaloric unit 100 may be in contact with heat load 400 by first switch 600. Further, if the temperature of magnetocaloric unit 100 is between the second temperature (e.g., about $-10°$ C.) and the first temperature (e.g., about $60°$ C.), magnetocaloric unit 100 may be isolated from both heat sink 300 and heat load 400 by first switch 600 and second switch 700.

Referring to FIG. 4, when a temperature of magnetocaloric unit 100 is lower than the second temperature (e.g., about $-10°$ C.), magnetocaloric unit 100 may be in contact with heat load 400 and may absorb heat from heat load 400 by thermal conduction (block 21). The temperature of magnetocaloric unit 100 may increase to the start temperature (e.g., about $-5°$ C.) by the absorption of heat from heat load 400 (as depicted by arrow 22). Further, magnetocaloric unit 100 may be isolated from heat load 400 by first switch 600 at a higher temperature than the second temperature (e.g., about $-10°$ C.) and may stop the absorption of heat from heat load 400. In one embodiment, first switch 600 may be a thermostat switch, which is expanded at the higher temperature. The isolated distance between magnetocaloric unit 100 and heat load 400 may correspond to the height of expanded first switch 600. An operation of first switch 600 according to the temperature of magnetocaloric unit 100 will be explained later with reference to FIGS. 6A and 6B.

Furthermore, if the temperature of magnetocaloric unit 100 reaches the start temperature (e.g., about $-5°$ C.), electromagnet 200 may apply a magnetic field to magnetocaloric unit 100 (block 23). In this case, the temperature of magnetocaloric unit 100 is sensed by temperature sensor 800, and controller 900 may generate a control signal based on the sensed temperature and transmit the control signal to electromagnet 200 so as to apply the magnetic field to magnetocaloric unit 100.

Then, the temperature of magnetocaloric unit 100 may increase to be higher than the first temperature (e.g., about 60° C.) by the application of the magnetic field (as depicted by arrow 24). Moreover, if the temperature of magnetocaloric unit 100 increases to the first temperature (e.g., about 60° C.) or higher, magnetocaloric unit 100 may be in contact with heat sink 300 by using second switch 700 and may transfer heat to heat sink 300 (block 25).

To be more specific, heat of magnetocaloric unit 100 may be radiated to second switch 700, and, a height of second switch 700 may be gradually decreased due to the heat radiation. Thus, at the temperature higher than the first temperature (e.g., about 60° C.), magnetocaloric unit 100 may be in contact with heat sink 300 by heated second switch 700. By way of example, second switch 700 may be a spring, such as a coil spring or a leaf spring, and a spring constant and restoring force of heated second switch 700 against a weight of heat sink 300 will be decreased due to the heat transfer. Accordingly, the distance between heat sink 300 and heated magnetocaloric unit 100, i.e., the height of heated second switch 700, can be reduced such that heat sink 300 can be in contact with magnetocaloric unit 100. Then, heated magnetocaloric unit 100 may emit heat therein through heat sink 300.

The temperature of magnetocaloric unit 100 may decrease to the stop temperature (e.g., about 55° C.) because of the transfer of heat to heat sink 300 (as depicted by arrow 26). At a lower temperature than the first temperature (e.g., about 60° C.), the decreased height of second switch 700 may be recovered to the original height of second switch 700. Thus, magnetocaloric unit 100 may be isolated from heat sink 300 by second switch 700 at the lower temperature, and may stop the transfer of heat to heat sink 300.

Moreover, heated magnetocaloric unit 100 may further emit heat therein to the refrigerant in refrigerant storage 500, so that the temperature of magnetocaloric unit 100 can decrease rapidly. More specifically, refrigerant storage 500 may be surrounded by magnetocaloric unit 100, and the refrigerant in refrigerant storage 500 may cool down magnetocaloric unit 100 by absorbing heat from magnetocaloric unit 100 by evaporation thereof, as described above. Therefore, magnetocaloric unit 100 can sufficiently and rapidly emit the heat therein through both refrigerant storage 500 and heat sink 300.

Still further, if the temperature of magnetocaloric unit 100 decreases to the stop temperature (e.g., about 55° C.), electromagnet 200 may stop the application of the magnetic field to magnetocaloric unit 100 (block 27). Thus, the temperature of magnetocaloric unit 100 may decrease to a temperature lower than the second temperature (e.g., about −10° C.) by the stop of the application of the magnetic field (arrow 28).

Then, magnetocaloric unit 100 may be in contact with heat load 400 and may absorb heat from heat load 400 again (block 21). Thereafter, the aforementioned operations will be repeated.

As discussed above, the refrigerant in refrigerant storage 500 may cool down magnetocaloric unit 100 by absorbing heat from magnetocaloric unit 100 by evaporation thereof. In this case, a boiling point of the refrigerant may be in the range from about 30° C. to about 60° C. at a pressure of about 1 atm, but it is not limited thereto.

In one embodiment, the refrigerant may include perfluorocarbon (PFC). For example, FC-72™ can be used as the refrigerant. FC-72™ is a clear, colorless, fully-fluorinated liquid. Boiling point and pour point of FC-72™ are about 56° C. and −90° C., respectively. A following formula I can be used to calculate specific heat, thermal conductivity and density of FC-72™ at various temperatures. In formula 1, T is a temperature of FC-72™.

Specific Heat (J kg$^{-1}$C$^{-1}$)=1014+1.554 (T,° C.)

Thermal Conductivity (W m$^{-1}$° C.$^{-1}$)=0.060−0.00011 (T,° C.)

Density (kg/m$^3$)=1740−2.61(T,° C.)

$$\text{Log}_{10}(\text{Vapor Pressure(pascals)})=9.729-(1562/(T,K)) \quad \text{[Formula 1]}$$

Figure 5A:
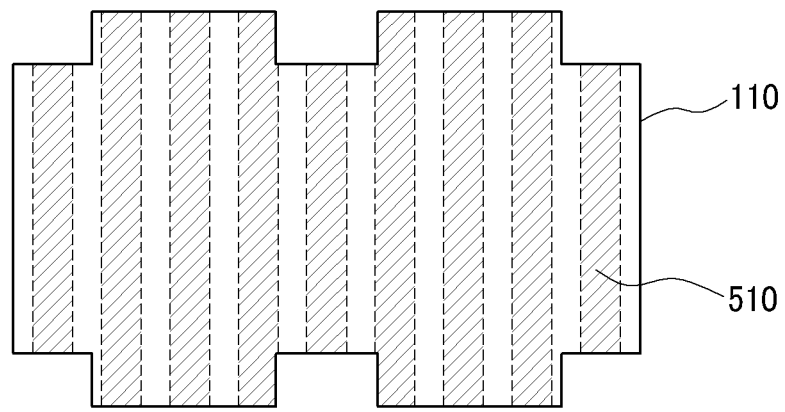
FIG. 5A is a longitudinal cross-sectional view of another illustrative embodiment of a magnetocaloric unit including refrigerant storages.
Figure 5B:
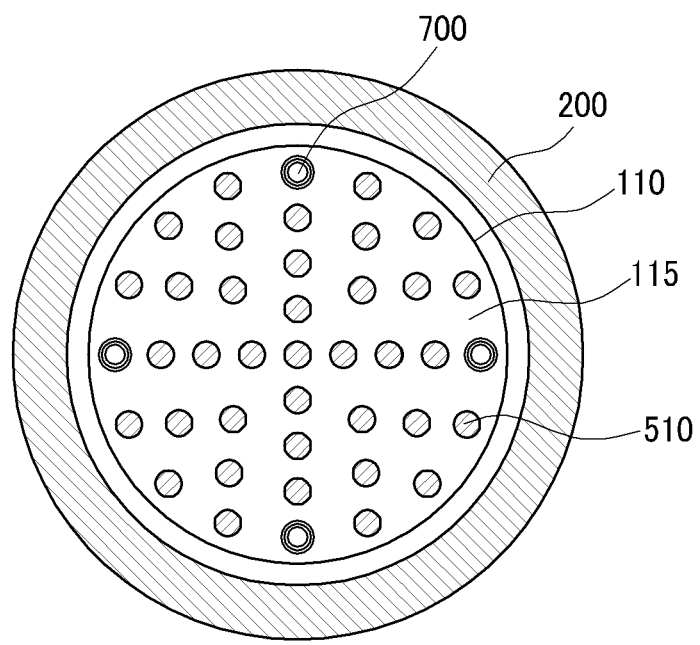
FIG. 5B is a top view of the magnetocaloric unit shown in FIG. 5A.

FIG. 5A is a longitudinal cross-sectional view of another illustrative embodiment of a magnetocaloric unit, and FIG. 5B is a top view of magnetocaloric unit 110 shown in FIG. 5A. FIG. 5A and FIG. 5B depict that a magnetocaloric unit 110 includes multiple refrigerant storages 510. Multiple refrigerant storages 510 may be installed within magnetocaloric unit 110 such that each refrigerant storage 510 can be surrounded by magnetocaloric material 115, and refrigerant in refrigerant storages 510 can be indirectly contacted with magnetocaloric unit 110 via refrigerant storages 510. By way of example, FIG. 5A illustrates multiple refrigerant storages 510 are placed in magnetocaloric unit 110 with magnetocaloric material 115 therebetween. Accordingly, a heat transfer between magnetocaloric unit 110 and the refrigerant can be carried out effectively, and the refrigerant can absorb heat from magnetocaloric unit 110 efficiently.

Although FIGS. 1, 3, 5A and 5B illustrate that each of magnetocaloric unit 100, magnetocaloric unit 110, electromagnet 200, refrigerant storage 500, and refrigerant storage 510 has a cylindrical shape, it is apparent to those skilled in the art that such element may has another shape. By way of example, magnetocaloric unit 100 or 110, electromagnet 200, or refrigerant storage 500 or 510 may have a tube shape or a hexahedron shape.

Figure 6A:
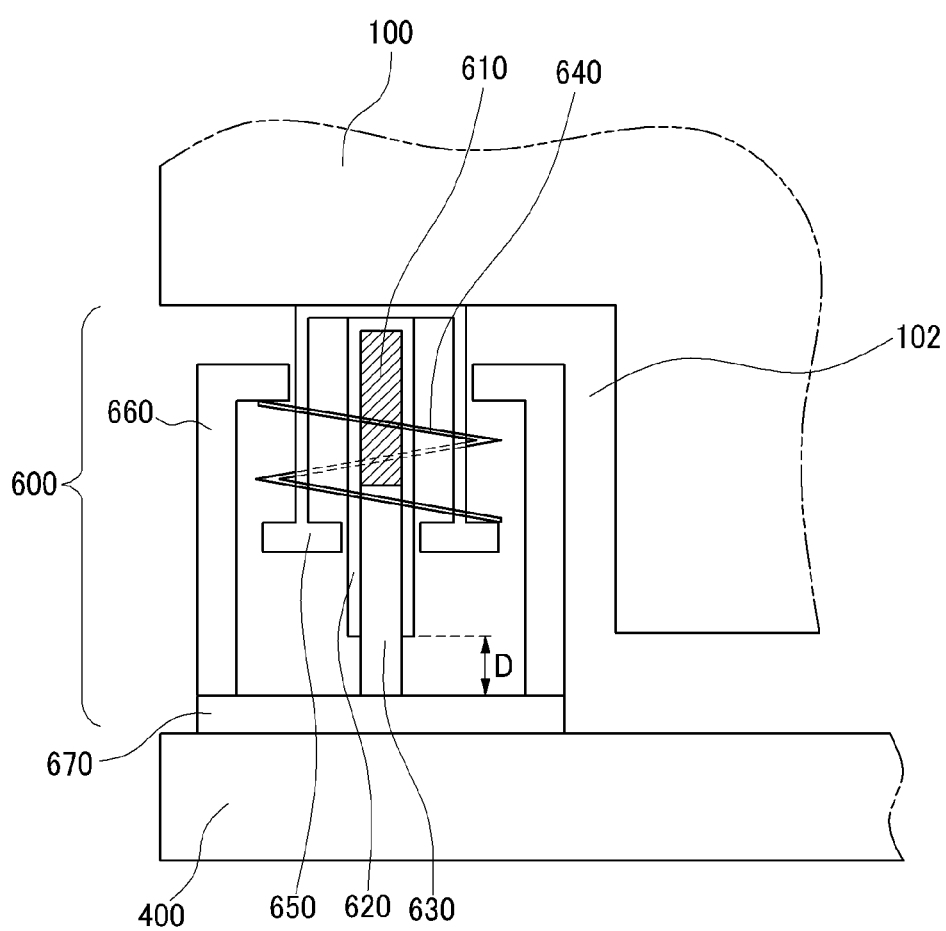
FIG. 6A shows a schematic diagram illustrating a first switch disposed between a magnetocaloric unit and a heat load at a predetermined temperature or higher.
Figure 6B:
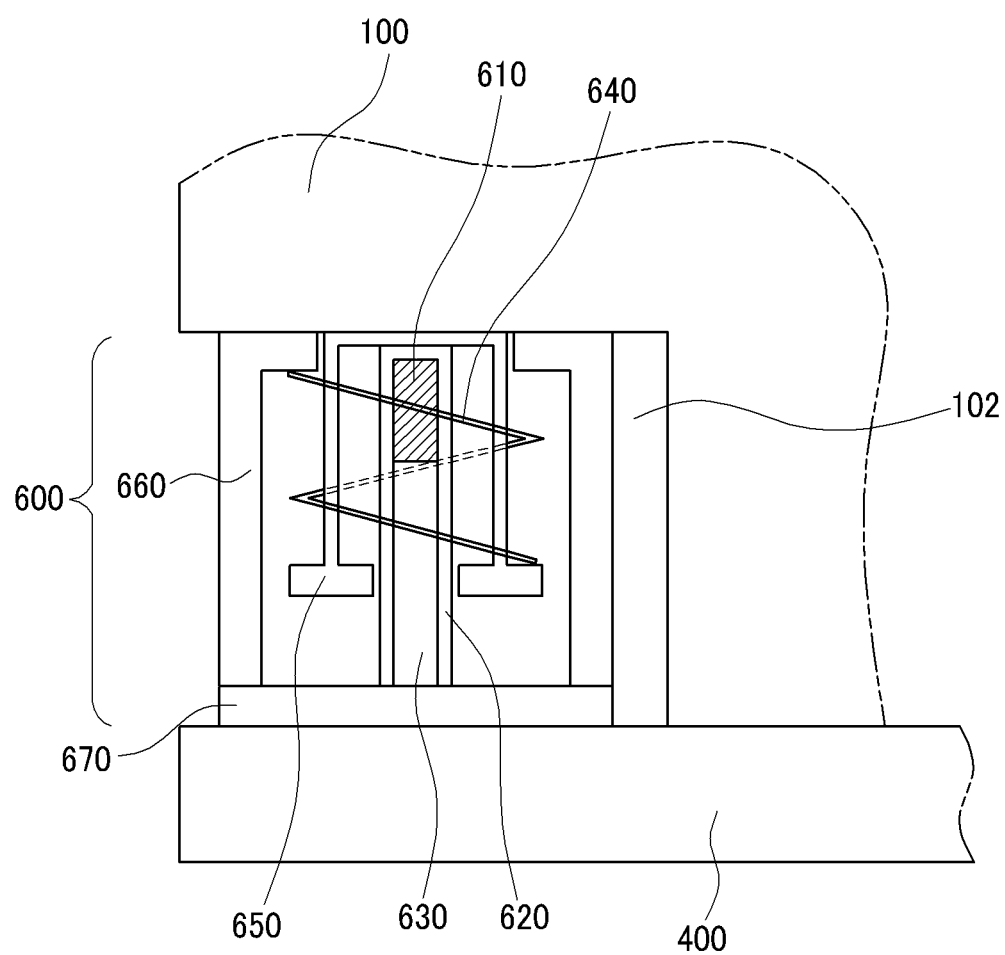
FIG. 6B shows a schematic diagram illustrating the first switch disposed between the magnetocaloric unit and the heat load at a temperature lower than the predetermined temperature.

FIG. 6A shows a schematic diagram illustrating first switch 600 disposed between magnetocaloric unit 100 and heat load 400 at the second temperature or higher. FIG. 6B shows a schematic diagram illustrating first switch 600 disposed between magnetocaloric unit 100 and heat load 400 at a temperature lower than the second temperature.

FIG. 6A and FIG. 6B illustrate that first switch 600 includes a pellet 620 configured to contain thermal liquid 610, a spindle 630 configured to support pellet 620 against expansion of thermal liquid 610, a spring 640, and spring stoppers 650 and 660 configured to hold spring 640, and an insulation panel 670 disposed on heat load 400. Some embodiments may optionally lack some of the listed elements. For example, first switch 600 may optionally lack of spring 640, which will be described hereinafter.

Thermal liquid 610 is expanded or contracted according to a temperature of magnetocaloric unit 100. If the temperature of magnetocaloric unit 100 increases, thermal liquid 610 may be expanded, whereas if the temperature of magnetocaloric unit 100 decreases, thermal liquid 610 may be contracted. Thermal liquid 610 may include, for example, but not limited to, alcohol, ethylene glycol, or glycerine.

Pellet 620 is configured to contain thermal liquid 610, and spindle 630 is configured to support pellet 620 against expansion of thermal liquid 610. If thermal liquid 610 expands, pellet 620 may be moved upward along spindle 630. Whereas, thermal liquid 610 contracts, pellet 620 may be moved downward along spindle 630.

Spring 640 is disposed between spring stoppers 650 and 660, and spring stoppers 650 and 660 are configured to hold spring 640 in first switch 600. Spring 640 may vertically push ends of spring stoppers 650 and 660. Thus, when thermal liquid 610 contracts, spring stopper 650 can maintain contact with pellet 620 by spring 640. Insulation panel 670 is disposed on heat load 400 and is configured to prevent heat transfer from heat load 400.

Referring to FIG. 6A, if a temperature of magnetocaloric unit 100 increases to the second temperature or higher, magnetocaloric unit 100 may be isolated from heat load 400. To be more specific, if a temperature of magnetocaloric unit 100 increases, heat of magnetocaloric unit 100 may be transferred to thermal liquid 610 by thermal conduction and thermal liquid 610 may be expanded. Then, expanded thermal liquid 610 may push pellet 620 and spindle 630 against magnetocaloric unit 100 and heat load 400, respectively. As thermal liquid 610 expands, pellet 620 moves up along spindle 630 and the distance D between pellet 620 and spindle 630 is greater. The expansion of thermal liquid 610 may be continued as a temperature of thermal liquid 610 increases, and the distance D may be getting greater as thermal liquid 610 expands. Further, at the second temperature or higher, the distance D is large enough to isolate magnetocaloric unit 100 from heat load 400. That is, by pushing magnetocaloric unit 100 and heat load 400 in opposite directions by pellet 620 and spindle 630, a portion of magnetocaloric unit 100 not contacting with first switch 600 may be isolated from heat load 400. Further, first switch 600 may maintain the isolation if the temperature of magnetocaloric unit 100 is higher than the second temperature.

Referring to FIG. 6B, if a temperature of magnetocaloric unit 100 decreases to a temperature lower than the second temperature, magnetocaloric unit 100 may be in contact with heat load 400. To be more specific, if the temperature of magnetocaloric unit 100 decreases, the heat of thermal liquid 610 may transfer to magnetocaloric unit 100 by thermal conduction and thermal liquid 610 may be cooled down. Then, thermal liquid 610 may contract, and pellet 620 may move downward along spindle 630. The contraction of thermal liquid 610 may be continued as the temperature of thermal liquid 610 decreases, and the distance D may be getting shorter as thermal liquid 610 contracts. Further, at a temperature below the second temperature, the portion of magnetocaloric unit 100 not contacting with first switch 600 may be in contact with heat load 400.

Figure 7:
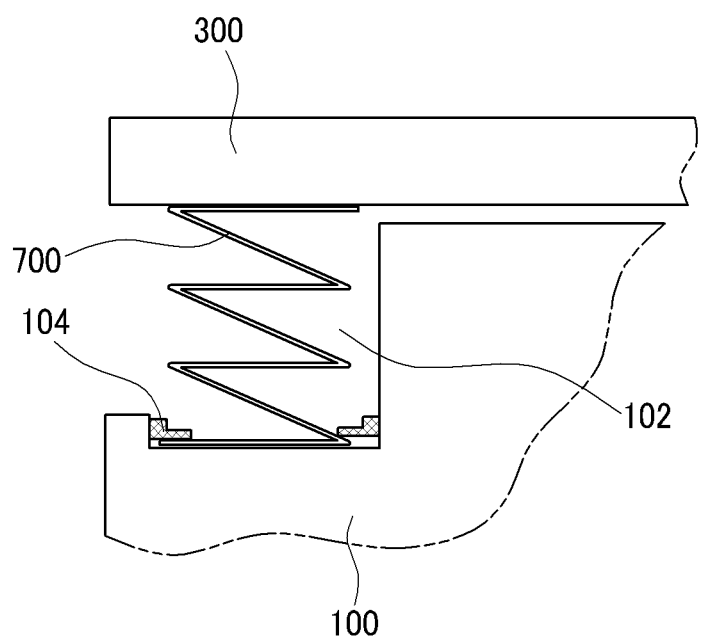
FIG. 7 shows an illustrative embodiment of a second switch disposed between the magnetocaloric unit and the heat sink.

FIG. 7 shows an illustrative embodiment of second switch 700 disposed between magnetocaloric unit 100 and heat sink 300. FIG. 7 depicts magnetocaloric unit 100 includes one or more recesses 102 (although one is shown in FIG. 7 for the simplicity of explanation) configured to receive second switch 700, and switch holder 104 configured to hold second switch 700 in recess 102.

Second switch 700 may be disposed between magnetocaloric unit 100 and heat sink 300. Specifically, second switch 700 may be mounted in recess 102 of magnetocaloric unit 100 and may be held in recess 102 by switch holder 104. Further, heat sink 300 may be mounted on second switch 700.

Second switch 700 may make at least a portion of magnetocaloric unit 100 contact with or isolated from heat sink 300 based on a temperature of magnetocaloric unit 100. For examples, second switch 700 may include, but not limited to, a coil spring or a leaf spring. If the temperature of magnetocaloric unit 100 increases, heat of magnetocaloric unit 100 may be transferred to second switch 700 by thermal conduction and, thus, second switch 700 may be heated. Accordingly, a spring constant and restoring force of second switch 700 against a weight of heat sink 300 may be decreased, so that the height of heated second switch 700 decreases. Thus, heat sink 300 may be lowered down by heated second switch 700 and be in contact with magnetocaloric unit 100.

Whereas, if the temperature of magnetocaloric unit 100 decreases, heat of second switch 700 may be transferred to magnetocaloric unit 100 by thermal conduction and, thus, second switch 700 may be cooled down. Accordingly, a spring constant and restoring force of second switch 700 against a weight of heat sink 300 may be increased, so that the height of cooled second switch 700 increases. Thus, heat sink 300 may be lifted up by cooled second switch 700 and be isolated from magnetocaloric unit 100.

Figure 8:
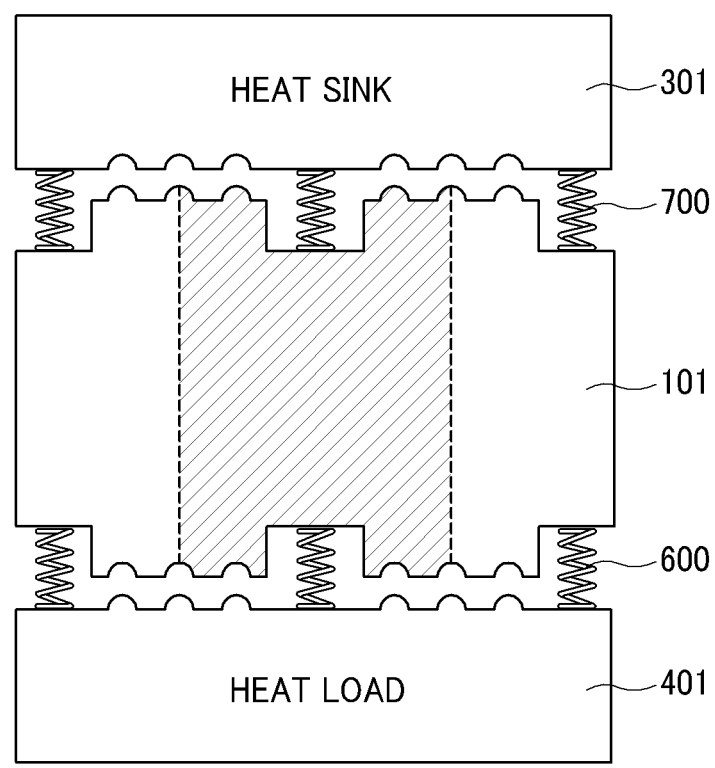
FIG. 8 shows another illustrative embodiment of a magnetocaloric unit having embossed patterns.

FIG. 8 shows another illustrative embodiment of a magnetocaloric unit having embossed patterns. As depicted in FIG. 8, magnetocaloric unit 101 may have at least one embossed pattern on at least one surface facing heat load 401 and/or the heat sink 301, in order to increase an area of magnetocaloric unit 101 in contact with heat sink 301 or heat load 401. Further, at least one of heat sink 301 and heat load 401 may have an embossed pattern, corresponding to the embossed pattern of magnetocaloric unit 101, on their surface. Thus, magnetocaloric unit 101 can have a larger contact area in contact with heat sink 301 or heat load 401 and may absorb the heat from heat load 401 and emit the heat through heat sink 301 efficiently. The embossed pattern may have various patterns or shapes, such as a substantially triangular embossed pattern, a substantially rectangular embossed pattern, a polygonal embossed pattern, or a substantially semicircular embossed pattern.

Figure 9:
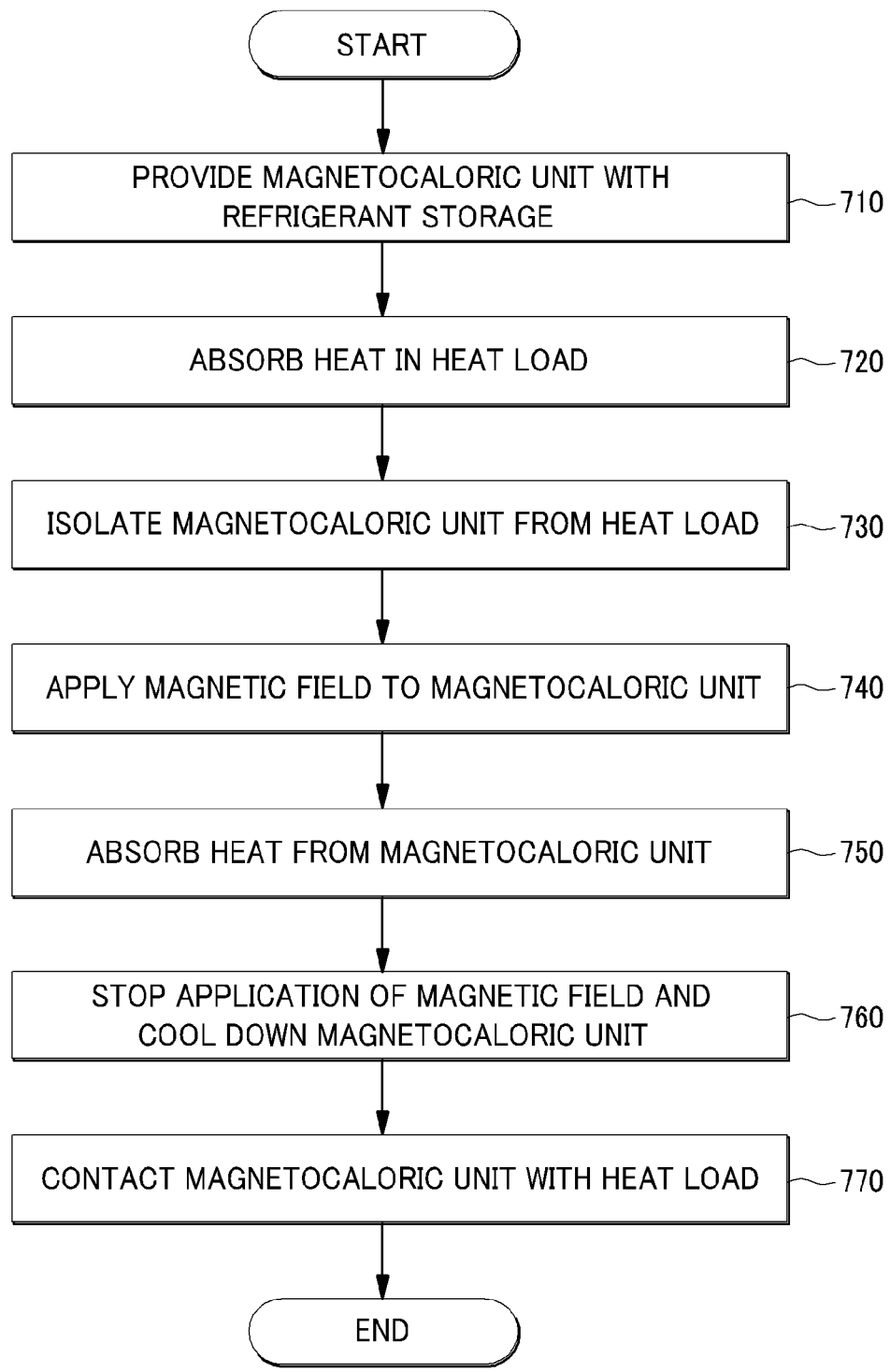
FIG. 9 is a flow chart of an illustrative embodiment of a method of controlling the cooling device.

FIG. 9 is a flow chart of an illustrative embodiment of a method of controlling the cooling device. Magnetocaloric unit 100 including refrigerant storage 500 is provided (block 710). By way of examples, at least one refrigerant storage 500 may be installed within magnetocaloric unit 100, and refrigerant storage 500 may be filled with a refrigerant such as FC-72™. Magnetocaloric unit 100 and refrigerant storage 500 may have, for example, but not limited to, a cylinder shape, a tube shape, or a hexahedron shape.

Magnetocaloric unit 100 absorbs heat from heat load 400, when a temperature of magnetocaloric unit 100 is lower than the second temperature described in the illustrative embodiment referring to FIG. 4 (block 720). Since at le ast a portion of magnetocaloric unit 100 is in contact with heat load 400, magnetocaloric unit 100 can absorb heat from heat load 400 by thermal conduction.

Magnetocaloric unit 100 is isolated from heat load 400 by first switch 600 (block 730). If a temperature of magnetocaloric unit 100 is higher than the second temperature, first switch 600 isolates magnetocaloric unit 100 from heat load 400.

Then, electromagnet 200 applies magnetic field to magnetocaloric unit 100 (block 740). If the temperature of magnetocaloric unit 100 increases to the start temperature described in the illustrative embodiment referring to FIG. 4 by absorption of heat from heat load 400, electromagnet 200 applies magnetic field to magnetocaloric unit 100. Then, magnetocaloric unit 100 will be heated up to a temperature higher than the start temperature.

The refrigerant in refrigerant storage 500 absorbs heat from magnetocaloric unit 100 to which the magnetic field has been applied (block 750). The refrigerant in refrigerant storage 500 may cool down magnetocaloric unit 100 by evaporation thereof. Thus, the refrigerant may absorb heat from magnetocaloric unit 100 as magnetocaloric unit 100 is heated by the application of the magnetic field.

A boiling point of the refrigerant may be in the range from about 30° C. to about 60° C. at a pressure of about 1 atm, but it is not limited thereto. The refrigerant may include perfluorocarbon (PFC). For example, FC-72™, the boiling point of which is about 56° C., can be used as the refrigerant.

Electromagnet 200 stops application of the magnetic field to magnetocaloric, when a temperature of magnetocaloric unit 100 reaches the stop temperature described in the illustrative embodiment referring to FIG. 4 (block 760). Then, magnetocaloric unit 100 is cooled down. After the application of the magnetic field to magnetocaloric unit 100 is stopped for a certain time, magnetocaloric unit 100 may be cooled down to a reduced temperature as compared to the stop temperature. In another embodiment, magnetocaloric unit 100 is made contact with heat sink 300 by second switch 700 at a first temperature described in the illustrative embodiment referring to FIG. 4. In this case, magnetocaloric unit 100 may be cooled down more rapidly. Magnetocaloric unit 100 is made contact with heat load 400 and absorbs heat from heat load 400 again (block 770) by first switch 600.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A cooling device comprising:
a magnetocaloric unit disposed between a heat sink and a heat load, wherein the magnetocaloric unit includes a recess formed in a surface of the magnetocaloric unit that faces the heat load;
an electromagnet operably connected with the magnetocaloric unit;
at least one refrigerant storage included in the magnetocaloric unit; and
a first device at least partially disposed in the recess and disposed between the magnetocaloric unit and the heat load, wherein the first device is configured to selectively couple or decouple the surface of the magnetocaloric unit that faces the heat load directly to or from a surface of the heat load that faces the magnetocaloric unit such that the surface of the magnetocaloric unit that faces the heat load selectively contacts the surface of the heat load that faces the magnetocaloric unit,
wherein the magnetocaloric unit is cooled down by using an evaporation heat of a refrigerant in the refrigerant storage.

2. The cooling device of claim 1, wherein the electromagnet is configured to apply a magnetic field to the magnetocaloric unit and to heat the magnetocaloric unit up to a boiling point of the refrigerant.

3. The cooling device of claim 1, wherein the first device comprises at least one first switch.

4. The cooling device of claim 3, further comprising:
at least one second switch disposed between the magnetocaloric unit and the heat sink.

5. The cooling device of claim 3, wherein the at least one first switch comprises a thermostat switch.

6. The cooling device of claim 4, wherein the magnetocaloric unit further includes at least one recess formed in a surface of the magnetocaloric unit that faces the heat sink and wherein the at least one second switch is at least partially disposed in the at least one recess formed in the surface of the magnetocaloric unit that faces the heat sink.

7. The cooling device of claim 6, wherein the magnetocaloric unit further includes at least one switch holder configured to hold the at least one second switch in the at least one recess formed in the surface of the magnetocaloric unit that faces the heat sink.

8. The cooling device of claim 1, wherein the refrigerant includes perfluorocarbon (PFC).

9. The cooling device of claim 8, wherein a boiling point of the refrigerant ranges from about 30° C. to about 60° C. at about 1 atm.

10. The cooling device of claim 8, wherein the magnetocaloric unit includes at least one of Gadolinium (Gd) and MnFe (P, As) alloys.

11. The cooling device of claim 8, wherein the magnetocaloric unit has at least one embossed pattern on at least one surface facing the heat load and/or the heat sink.

12. A magnetocaloric device comprising:
a magnetocaloric material that includes a recess formed in a surface of the magnetocaloric material that faces a heat load;
a first device at least partially disposed in the recess and disposed between the magnetocaloric material and the heat load, wherein the first device is configured to selectively couple or decouple the surface of the magnetocaloric material that faces the heat load directly to or from a surface of the heat load that faces the magnetocaloric material such that the surface of the magnetocaloric material that faces the heat load selectively contacts the surface of the heat load that faces the magnetocaloric material; and
at least one refrigerant storage including a refrigerant, the at least one refrigerant storage surrounded by the magnetocaloric material.

13. The magnetocaloric device of claim 12, wherein the at least one refrigerant storage has at least one of tube shape, hexahedron shape and cylinder shape.

14. The magnetocaloric device of claim 12, wherein the magnetocaloric unit has at least one embossed pattern on at least one surface thereof.

15. The magnetocaloric device of claim 12, wherein the refrigerant includes perfluorocarbon (PFC).

16. The magnetocaloric device of claim 15, wherein a boiling point of the refrigerant ranges from about 30° C. to about 60° C. at about 1 atm.

17. A method for controlling a cooling device in which a magnetocaloric unit is placed between a heat sink and a heat load, the method comprising:
absorbing heat in the heat load by the magnetocaloric unit;
isolating the magnetocaloric unit from the heat load by at least one first device at least partially disposed in a recess formed in a surface of the magnetocaloric unit that faces the heat load, including operating the at least one first device to selectively decouple the surface of the magnetocaloric unit that faces the heat load from contact with a surface of the heat load that faces the magnetocaloric unit;
applying a magnetic field to the magnetocaloric unit; and
cooling down the magnetocaloric unit by an evaporation heat of a refrigerant in at least one refrigerant storage included in the magnetocaloric unit.

18. The method of claim 17, further comprising:
making at least a portion of the magnetocaloric unit in contact with the heat sink by at least one second switch disposed between the magnetocaloric unit and the heat sink at a first temperature of the magnetocaloric unit.

19. The method of claim 17, wherein the refrigerant includes perfluorocarbon (PFC).

20. The method of claim 17, further comprising:
maintaining the isolating if a temperature of the magnetocaloric unit is higher than a second temperature.

* * * * *